March 18, 1947. E. N. NATKINS 2,417,436
FLEXIBLE DRIVE COUPLING
Filed Sept. 3, 1942
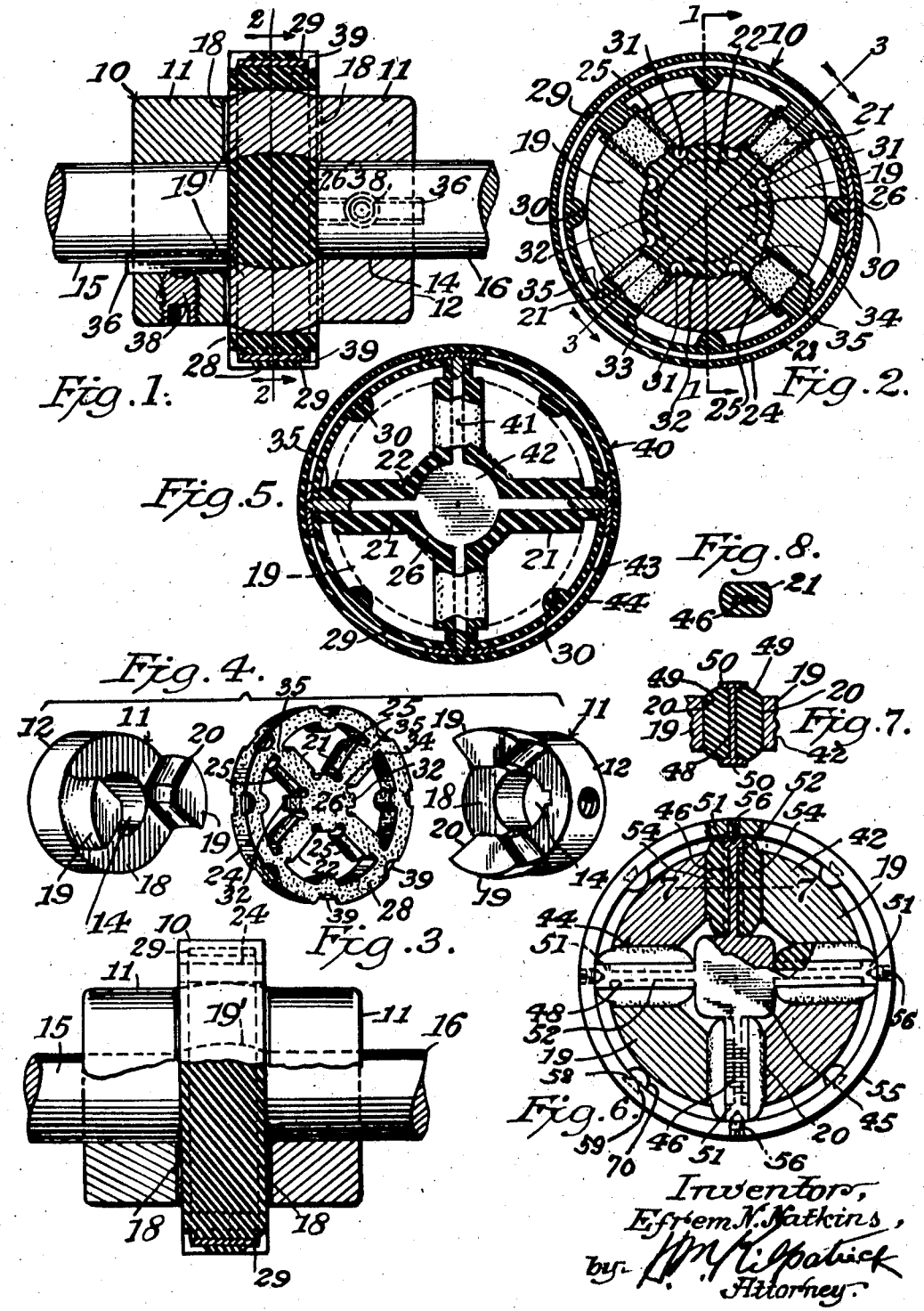

Patented Mar. 18, 1947

2,417,436

UNITED STATES PATENT OFFICE 2,417,436

FLEXIBLE DRIVE COUPLING

Efrem N. Natkins, New York, N. Y.

Application September 3, 1942, Serial No. 457,153

22 Claims. (Cl. 64—14)

This invention relates to a flexible coupling for attachment to adjacent ends of line drive shafting for compensating for mis-alignment and for assuring uniform compression and power transmission and reducing power loss to a minimum due to misaligned line shafting.

This invention herein relates particularly to flexible driven couplings shown in my United States Patent No. 2,295,003, issued September 8, 1942, resulting from application Serial Number 342,656, filed June 27, 1940, of which application the present application is a continuation in part.

In said application are shown couplings comprising a pair of opposed drive yokes of metal, each yoke being constituted by a circular head or hub-forming element centrally bored for receiving opposite ends of drive shaft sections which have key-way connections with the heads, and approximate key locking screws. These yokes further comprise opposite outstanding drove extensions or lugs, here shown as two in number for each yoke, and when the coupling is assembled lugs of the opposite yokes are located in staggered or alternate circumferential positions around the axes of the said heads, and this condition leaves a central opening and radial spaces into which a flexible or elastic insert or spider may be forced and held axially of the yoke and in interlocking engagement, the lugs having concave surfaces coacting with convex surfaces on the arms of said spider. A stiff ring spaced around the assembly of lugs and carried by projecting ends of the arms provides means for preventing pressure extrusion of the flexible arm of the spider from between the adjacent lugs when the coupling is working under heavy torsional working compression.

In the present application are claimed structures resulting in a further feature of advantage in the provision of a metal ring interiorly located and moulded in a yieldable ring disposed around the assembly of lugs integral with the flexible spider, this feature being provided to stiffen the ring.

A further feature resides in forming the yieldable insert on a metallic spider, the arms of which extend radially and are secured to a stiff metal ring which is molded in the retaining ring.

I provide a further modified feature for greater strength in super-pressure torsional drive shaft lines, for transmitting greater horsepower, which comprises a metal ring, within which is locked a metallic spider having oppositely channeled radial arms secured to the ring by radial screws, the arms being adapted for receiving flexible replaceable cushions fitted in the channels of the arms and engaged against the concave side surfaces of the lugs of said yoke.

The foregoing, and other features of advantage will be apprehended as the herein description proceeds and it will be obvious that modifications may be made in the structure herein disclosed, without departing from the spirit hereof or the scope of the appended claims.

In the drawing,

Fig. 1 is a longitudinal sectional elevation of one form of my coupling attached to adjacent ends of a drive shaft line, the section being taken on the line 1—1 of Fig. 2;

Fig. 2 is a cross sectional elevation substantially on the line 2—2 of Fig. 1;

Fig. 3 is a side elevation, partly in longitudinal section taken substantially on the line 3—3 of Fig. 2;

Fig. 4 is a view showing in perspective detail, the separated, component parts of the coupling of Fig. 1, disclosing the concave and convex surfaces of the parts for automatically interlocking them in operative position without the aid of screws, bolts or otherwise;

Fig. 5 is a section taken approximately through the central transverse plane of the insert similar to that of Fig. 4 showing a metal spider and ring molded in the insert;

Fig. 6 is a cross sectional elevation of a modified heavy-duty coupling employing a spider having channeled, metal arms with their ends secured against side and radial strains and mounting compressible cushions; and Fig. 7 is a detail cross section through one of the spider arms and its compressible cushion and taken on the line 7—7 Fig. 6; and Fig. 8 is a cross sectional view, on a slightly smaller scale, of one of the arms of the flexible spider of Fig. 4 showing the metal spider insert.

In the construction of the improved coupling here shown generally by references numerals 10 Figs. 1, 2, and 3, a pair of identical yokes 11, are employed and each has a cylindrical hub or head 12, each hub having a bore 14, for receiving the opposite ends, respectively, of a drive and driven shafts 15 and 16.

Projecting from their adjacent faces 18, each cylindrical hub 12 is formed with two longitudinally curved lugs 19, 19 having concave faces or sides 20, for receiving between the lugs the arms 21 of a flexible spider or insert 22 which arms carry a retaining ring 24 and have convex sides 25 engaging the concave sides 20. The arms 21 are of flexible material, such as rubber, and radiate from the common central body 26 of the same material.

The lug faces of sides 20 engaging each arm and the engaged arm faces or sides 25 converge slightly toward the edges and are approximately parallel to each other and to a radial plane passing midway between the faces of the arm, thereby reducing the tendency to carry the arm from between the lugs; and the restraining ring 24 is disposed around the assembly of lugs and insert and spaced from the lugs, and joined to, and entirely carried by the outer ends of the arms, for preventing the extrusion of the arms from between the lugs 19. The body 26, arms 21 and the rubber part 28 of the ring comprise a single piece of molded rubber having a stiffening endless metal ring 29 molded in the rubber annulus of the ring 24.

The inner face of the restraining ring is provided midway between each pair of adjacent arms with a protuberance 30 engaging the outer curved face of the adjacent lug for preventing the ring from being distorted or drawn against the lugs. These protuberances also slide freely on the lugs 19 to allow free relative angular movement of the yokes and provide mechanical engagement with the metal portions of the metal driving and driven yokes to retain the ring concentric with the body 29 and assist the body 29 in preventing the yokes from rotating eccentrically or out of balance and serve to resiliently distribute the reactions of the driving forces exerted in the coupling during operation.

The insert 22 at the juncture of the convex faces of the arms 21 with said central body is provided with deep rounded grooves 31 forming projections 32 therebetween, the outer faces of said projections engaging the inner faces of the lugs being substantially curved as shown at 19' of Fig. 3 concentric with a mid-point of the body 26 substantially on the axis of the members, for positioning the lugs and insert relative to each other and facilitating relative angular movement of the shafts 15, 16.

Said grooves 31 form inner reduced ends 34 for the arms, and the outer end portions of the arms where they project from between the lugs are reduced to form outer reduced ends 35, said reduced ends being disposed entirely between and away from the planes of said approximately parallel faces 20 thereby to avoid cutting of the arms by the lugs at the edges of the lugs.

The yoke may be held against rotation on their shaft sections by any suitable means such as keys 36 held in suitable key-ways by set screws 38.

The edges of the metal ring 29 may be exposed, by molded-in recesses 39 located at desired intervals about both perimetral edges of the rubber annulus 28. These recesses result from positiontion devices engaged with the metal ring 29 during the molding process to hold the ring from distortion during the molding. These recesses also expose portions of the metallic ring and dissipate heat therefrom.

The metal ring 29 being molded in the rubber is protected from corrosion and is easily assembled during the molding. The whole ring is strong and light in weight, and retains its shape and position relative to the rubber arms.

From the foregoing it will be noted that the structure of the form of cushion coupling disclosed in Figs. 1 to 4 comprise integral ringed spider 22 molded of solid rubber of toughened, but resilient nature, fitted to be receivably assembled between two metal driving yokes, which coupling is provided with an outer annulus 29, which acts to retain the spider cushion construction in circular compressive assembly, against expansion action, but is integral with the resilient cushion spider.

In the form of the invention of Fig. 5, the flexible insert 40 exteriorly similar to that of Figs. 1 to 4 is molded on a metallic assembly comprising a metallic spider 41, 42 having a central body 42 and radial stiffening arms 41 to the outer ends of which are secured a stiffening ring 43 molded in the rubber ring 49 similarly to the ring 29. The arms 19 are indicated in Fig. 5 by dotted lines.

The insert 40 may be provided with protuberances 30 and other exterior features of the insert of Figs. 1 to 4. Because of the metallic spider the insert of Fig. 5 is suitable for transmitting heavier loads than the couplings of Figs. 1 to 4.

In Figs. 6 and 7 there is shown a coupling designed to transmit greater loads under long periods of use, and which may be easily repaired by replacement of parts that may break down. To this end, this modified coupling, Fig. 6 comprises metal yokes 19, having shaft engaging sleeve or hub portions 12, 12 as in Figs. 1 to 4.

The insert generally designated by 44 comprises an inner metal spider-cushion seating member having a solid hub 45 from which radially extend four equally spaced integral flat arms 46, having their flat faces 48 (Fig. 7) substantially parallel with the opposing yoke driving faces 20, the opposite side edges of the flat arms 46 having narrow flanges 50 thereon, the outer ends of the arms being also provided with the capping flanges 51, thus forming rectangular shaped pockets 52 on the opposite faces of said arms, as shown in Fig. 6.

Inserted in the pockets 52 on each side of said arms are rubber cushion pieces 54, these being molded to snugly fit and hold themselves in the rectangular pockets, and each having the extending, cushioning faces 49 convexed to fit against the concave faces of the lugs 19, Fig. 7.

The cushion elements may be easily replaced when wear or disintegration takes place.

The ends of each of the cushions 54 are so molded as to be formed and fit about the capping flanges 51 and also to extend beyond the yoke lugs 42.

In order to protect the arms 46 and the outer ends of the cushion elements 54, an outer protective ring 55 is spaced around the mid-section of the assembled coupling as shown in Fig. 6, the inner face of said ring 55 being mounted upon the capping flanges 51 of the arms 43 and held in place by a cone pointed headless screw 56 threadably mounted in the ring at each flange 51, the cone point of each screw being seated in each said flange as shown in Fig. 6. Thus the protecting ring 55 is firmly, removably and operatively held in cushion-end projecting position. Due to this construction the cushion elements 54 are easily removed and replaced when required.

The inner face of the ring 55 between the arms may be provided with shallow under-cut or dove-tail bores 58 in which may be molded tails 59 of rubber protuberances 70 similar in appearance and function to the protuberances 30.

The invention claimed is:

1. A coupling comprising a pair of opposed alinable members each comprising a rotary yoke and spaced lugs, the lugs of one member being disposed between lugs of the other member; an insert between said members comprising a part substantially at the axis of the yokes having substantially radial arms at substantially uniform front to rear thickness disposed between and having portions of yieldable material engaging adjacent faces of adjacent lugs; inner end portions of the arms where they project from the space between said lugs being of reduced thickness at the point of contact with the lugs to avoid cutting by the lug.

2. A coupling comprising a pair of opposed alinable members each comprising a rotary yoke and spaced lugs, the lugs of one member being disposed between lugs of the other member; an insert between said members comprising a central body substantially at the axis of the yokes having integral and one-piece therewith arms of substantially constant front to rear thickness disposed between adjacent lugs and having portions of yieldable material engaging adjacent faces of adjacent lugs; portions of the body adjacent to the lugs having deep recesses whereby portions of the body are held spaced from the lugs to provide cooling spaces.

3. A coupling comprising a pair of opposed alinable members each comprising a rotary yoke and spaced lugs, the lugs of one member being disposed between lugs of the other member; an insert between said members comprising a central body substantially at the axis of the yokes having substantially radial arms disposed between and having portions of yieldable material engaging adjacent faces of adjacent lugs; said arms having stiff metal cores for stiffening the arms; and means secured against slippage to the outer ends of the arms and holding the arms in approximately constant angular relation.

4. A coupling comprising a pair of opposed alinable members each comprising a rotary yoke and spaced lugs, the lugs of one member being disposed between lugs of the other member; and an assembly associated with the lugs and including a restraining ring spaced from and extending around the assembly of lugs and an insert between said members comprising a central body substantially at the axis of the yokes having substantially radial arms disposed between and having portions of yieldable material engaging adjacent faces of adjacent lugs, the outer ends of the arms being fast to and carrying the ring; portions of said assembly comprising a stiffening core carrying portions of the yieldable material engaging the lugs; the inner ends of the arms, where they project from the lugs, being of reduced thickness adjacent to the lugs, portions of said body being spaced from the lugs to provide ventilating spaces.

5. A coupling comprising a pair of opposed alinable rotary members each comprising spaced lugs, the lugs of one member being between lugs of the other member and a molded assembly of resilient material including an insert means between said members comprising distinct substantially radial arms between adjacent faces of adjacent lugs; and a restraining ring extended and spaced around the assembly of lugs and positively fastened and secured to the outer ends of the arms and positively holding said ends against relative movement circumferentially of the adjacent portion of the ring.

6. In a coupling as in claim 5, said arm being composed entirely of yieldable material, the ring being integral with the arm and having stiffening material therein.

7. A coupling comprising a pair of opposed alinable members each comprising a rotary yoke and spaced lugs, the lugs of one member being disposed between lugs of the other member; an insert between said members comprising a part having substantially radial arms disposed between, and having portions of yieldable material engaging adjacent faces of adjacent lugs; and a restraining ring of molded resilient rubber-like material extending around the assembly of lugs and carried by the outer end of the arms and having a metallic stiffening ring embedded thereon.

8. A coupling comprising a pair of opposed alinable members each comprising a rotary yoke and spaced lugs, the lugs of one member being disposed between lugs of the other member; an insert between said members including arms disposed between, and having portions of yieldable material engaging, adjacent faces of adjacent lugs and a part connecting the inner ends of the arms; and a restraining ring extending around the assembly of lugs and secured fast to the outer ends of the arms; and positively holding the ends of the arms against movement and slipping relative to the ring circumferentially of the adjacent portion of the ring.

9. A coupling comprising a pair of opposed alinable members each comprising a rotary yoke and spaced lugs, the lugs of one member being disposed between lugs of the other member; an insert between said members comprising a central body substantially at the axis of the yokes and having substantially radial arms disposed between and having portions of yieldable material engaging adjacent faces of adjacent lugs; and a restraining ring extending and spaced around the assembly of lugs and having parts thereof carried by the outer ends of the arms; the inner face of the ring being provided between each pair of adjacent arms with a soft rounded protuberance engaging the outer face of the lug.

10. A coupling comprising a pair of opposed alinable members each comprising a rotary yoke and spaced lugs, the lugs of one member being disposed between lugs of the other member; a molded insert of yieldable rubber-like material between said members comprising a part having substantially radial arms disposed between and having yieldable faces engaging adjacent faces of adjacent lugs; and a restraining ring extending around the assembly of lugs and having parts thereof carried by the outer ends of the arms and having a metallic stiffening molded therein and protuberances engaging the outer faces of the lugs.

11. A coupling comprising a pair of opposed alinable members each comprising a rotary yoke and spaced lugs, the lugs of one member being disposed between lugs of the other member; an insert between said members comprising a central body substantially at the axis of the yokes having substantially radial arms disposed between and having portions of yieldable material engaging adjacent faces of adjacent lugs; the insert at the juncture of the concave faces of the arms with said central body being provided with deep rounded grooves forming reduced inner ends of the arms.

12. A coupling comprising a pair of opposed alinable members each comprising a rotary yoke and spaced lugs, the lugs of one member being disposed between lugs of the other member; an insert between said members comprising a central body substantially at the axis of the yokes having substantially radial arms disposed between and having portions of yieldable material engaging adjacent faces of adjacent lugs; said body between the arms being provided with projections, the outer faces of said projections and the inner faces of the lugs being substantially spherically concentric with a point substantially on the axis of the members, for positioning the lugs and insert and facilitating their relative angular movement.

13. A coupling comprising a pair of opposed alinable members each comprising a rotary yoke and spaced lugs, the lugs of one member being disposed between lugs of the other member; an insert between said members comprising a central body substantially at the axis of the yokes having substantially radial arms disposed between adjacent lugs and having portions of yieldable material forming contact faces engaging adjacent faces of adjacent lugs; a restraining ring extending around the assembly of lugs and carried by the outer ends of the arms; the insert at the juncture of the contact faces of the arms with said central body being provided with deep rounded grooves forming projections therebetween, the outer faces of said projections and the inner faces of the lugs being substantially spherically concentric with a point substantially on the axis of the members, for positioning the lugs and the insert and facilitating their relative angular movement; said grooves forming inner reduced ends of the arms; said reduced ends where they project from between the lugs being disposed entirely between and away from the planes of said contact faces of the same arm thereby to eliminate cutting of the arms by the lugs.

14. A coupling comprising a pair of opposed members each comprising a rotary yoke and spaced lugs, the lugs of one member being disposed between lugs of the other member; a metallic spider between said members comprising a central body substantially at the axis of the yokes having substantially radial arms disposed between the lugs; yieldable material disposed on opposite faces of the arms facing the lugs respectively and engaging adjacent faces of adjacent lugs; and a metallic restraining ring extending around the assembly of lugs and secured against slippage fast on the outer ends of the arms and holding said ends against relative movement circumferentially of the adjacent portions of the ring.

15. A coupling comprising a pair of opposed members each comprising a rotary yoke and spaced lugs, the lugs of one member being disposed between lugs of the other member; a metallic insert between said members comprising a central body substantially at the axis of the yokes having substantially radial arms disposed between the lugs and each having large elongated pockets respectively facing the lugs; elongated blocks of yieldable material fitted in and projecting from said pockets respectively and engaging adjacent faces of adjacent lugs; a metallic restraining ring extending and spaced around the assembly of lugs and fast on the outer ends of the arms.

16. In a coupling as in claim 15, said body being spaced from the lugs to provide a ventilating air space between the body and lugs; the inner end of said blocks projecting into said space being beveled in a direction away from the lugs at the inner ends of said adjacent faces.

17. A coupling comprising a pair of opposed alinable members each comprising a rotary yoke and spaced lugs, the lugs of one member being disposed between lugs of the other member; an insert between said members comprising a part substantially at the axis of the yokes having arms disposed between, and having portions of yieldable material engaging, adjacent faces of adjacent lugs; a restraining ring extending around the assembly of lugs free of fast attachment to the lugs and having parts thereof carried by the outer ends of the arms; and means connecting the ends of the arms and the ring and holding the ends of the arms against movement relative to the ring circumferentially of the adjacent portion of the ring.

18. A coupling comprising a pair of opposed alinable members each comprising a rotary yoke and spaced lugs, the lugs of one member being disposed between lugs of the other member; an insert between said members comprising a central body substantially at the axis of the yokes having integral and one-piece therewith arms disposed between, and having portions of yieldable material engaging, adjacent faces of adjacent lugs; and means spaced from the arms holding portion of the body adjacent to the lugs spaced from the lugs.

19. A coupling comprising a pair of opposed alinable members each comprising a rotary yoke and spaced lugs, the lugs of one member being disposed between lugs of the other member; radial insert members disposed between, and having portions of yieldable material engaging, adjacent faces of adjacent lugs; and a restraining ring comprising yieldable material extending around the assembly of lugs and carried by the outer ends of the member, and a metallic stiffening ring embedded in said material, said material having series of outer peripheral notches therein exposing series of portions of the metallic ring.

20. A coupling comprising a pair of opposed alinable members each comprising a rotary yoke and spaced lugs, the lugs of one member being disposed between lugs of the other member; an insert between said members comprising a part substantially at the axis of the yokes having arms disposed between and having portions of yieldable material engaging adjacent faces of adjacent lugs; and a restraining ring extending around the assembly of lugs free of positive attachment to the lugs and positively secured fast to the outer ends of the arms and positively held against slippage relative to said ends circumferentially of the part of the ring adjacent to said ends and preventing slippage between the ring and said outer ends thereby to prevent change of distance between said outer ends thereby substantially to maintain constant the angular relation of the arms to each other.

21. A coupling comprising a pair of opposed alinable members each comprising a rotary yoke and spaced lugs, the lugs of one member being disposed between lugs of the other member; an insert between said members comprising a part substantially at the axis of the yokes having arms disposed between and having portions of yieldable material engaging adjacent faces of adjacent lugs; and a restraining ring extending and spaced around the assembly of lugs and positively fastened and secured to the outer ends of the arms and holding said ends against slippage and movement relative to said ends circumferentially of the part of the ring adjacent to said ends, substantially to prevent change of distance between said outer ends thereby substantially to maintain constant the angular relation of the arms to each other.

22. A coupling comprising a pair of opposed alinable members each comprising a rotary yoke and spaced lugs, the lugs of one member being disposed between lugs of the other member; an insert between said members comprising a part substantially at the axis of the yokes having arms disposed between and having portions of yieldable material engaging adjacent faces of adjacent lugs; and a restraining ring extending and spaced around the assembly of lugs free of positive attachment to the lugs and positively fastened and secured to the outer ends of the arms and positively holding said ends against slippage and movement relative to said ends circumferentially of the part of the ring adjacent to said ends; the outer ends of said arms where they project from the ends of the space between said lugs being of reduced front to rear thickness at the point of contact with the lugs, thereby to avoid cutting the lugs.

EFREM N. NATKINS.

REFERENCES CITED

The following references are of record in the file of this patent:

UNITED STATES PATENTS

| Number | Name | Date |
|---|---|---|
| 1,425,616 | Tarbox | Aug. 15, 1922 |
| 2,022,626 | Weis | Nov. 26, 1935 |
| 2,025,826 | Ricefield | Dec. 31, 1935 |
| 2,092,704 | Ricefield | Sept. 7, 1937 |
| 2,135,634 | Byrom | Nov. 8, 1938 |
| 2,213,277 | Guy | Sept. 3, 1940 |
| 2,295,003 | Natkins | Sept. 8, 1942 |
| 2,116,195 | Foster | May 3, 1938 |
| 2,003,848 | Grundy | June 4, 1935 |
| 1,843,787 | Russell | Feb. 2, 1932 |